United States Patent
Boelkins et al.

(10) Patent No.: US 8,934,998 B1
(45) Date of Patent: Jan. 13, 2015

(54) METHOD AND APPARATUS FOR DELIVERY OF MINIMUM QUANTITY LUBRICATION

(75) Inventors: Charles W. Boelkins, Ada, MI (US); Kevin M. Varnes, Kentwood, MI (US)

(73) Assignee: Unist, Inc., Grand Rapids, MI (US)

( * ) Notice: Subject to any disclaimer, the term of this patent is extended or adjusted under 35 U.S.C. 154(b) by 504 days.

(21) Appl. No.: 13/216,386

(22) Filed: Aug. 24, 2011

Related U.S. Application Data

(60) Provisional application No. 61/381,955, filed on Sep. 11, 2010.

(51) Int. Cl.
*G06F 19/00* (2011.01)

(52) U.S. Cl.
USPC .......................................... 700/159; 700/282

(58) Field of Classification Search
None
See application file for complete search history.

(56) References Cited

U.S. PATENT DOCUMENTS

| | | | | |
|---|---|---|---|---|
| 2,366,984 | A * | 1/1945 | Scheg et al. | 341/173 |
| 3,783,253 | A * | 1/1974 | Anderson et al. | 318/568.1 |
| 4,534,005 | A * | 8/1985 | Nagashima et al. | 700/282 |
| 4,692,872 | A * | 9/1987 | Kiya | 700/181 |
| 5,042,618 | A * | 8/1991 | Switalski et al. | 184/6.26 |
| 5,189,624 | A | 2/1993 | Barlow et al. | |
| 5,578,913 | A | 11/1996 | Yasuda et al. | |
| 5,785,123 | A * | 7/1998 | Lea, Jr. | 166/369 |
| 5,852,793 | A | 12/1998 | Board et al. | |
| 5,952,863 | A * | 9/1999 | Jones et al. | 327/295 |
| 6,145,626 | A | 11/2000 | Niemczura, Sr. et al. | |
| 6,171,073 | B1 * | 1/2001 | McKain et al. | 417/306 |
| 6,250,074 | B1 * | 6/2001 | Suzuki et al. | 60/285 |
| 6,783,309 | B2 * | 8/2004 | Makiyama | 409/136 |
| 6,797,188 | B1 * | 9/2004 | Shen et al. | 216/46 |
| 7,665,578 | B2 * | 2/2010 | Grozinger | 184/55.1 |
| 7,929,136 | B2 * | 4/2011 | Makiyama et al. | 356/337 |
| 7,980,127 | B1 * | 7/2011 | Hou | 73/273 |
| 8,044,883 | B2 * | 10/2011 | Jung et al. | 345/60 |
| 2005/0155417 | A1 * | 7/2005 | Emord | 73/113 |
| 2006/0039572 | A1 * | 2/2006 | Mun | 381/106 |
| 2006/0040584 | A1 | 2/2006 | Ray et al. | |
| 2006/0053900 | A1 * | 3/2006 | Walsh et al. | 73/861 |
| 2008/0148827 | A1 * | 6/2008 | Keski-Hynnila et al. | 73/114.31 |
| 2008/0264490 | A1 * | 10/2008 | York et al. | 137/8 |
| 2009/0148268 | A1 * | 6/2009 | Nobili | 415/10 |
| 2009/0279343 | A1 * | 11/2009 | Chang et al. | 365/148 |
| 2010/0202626 | A1 * | 8/2010 | Shiori et al. | 381/74 |
| 2011/0080441 | A1 * | 4/2011 | Wacyk et al. | 345/691 |
| 2011/0157751 | A1 * | 6/2011 | Kim | 361/18 |
| 2011/0208346 | A1 * | 8/2011 | Nagano | 700/159 |

FOREIGN PATENT DOCUMENTS

WO  WO 2008/114325  * 9/2008 ............. G01N 21/47

\* cited by examiner

*Primary Examiner* — Sean Shechtman
(74) *Attorney, Agent, or Firm* — McGarry Bair

(57) ABSTRACT

A method for controlling the flow of a minimum quantity lubricant (MQL) system to a computer numerical controlled (CNC) machining system.

17 Claims, 8 Drawing Sheets

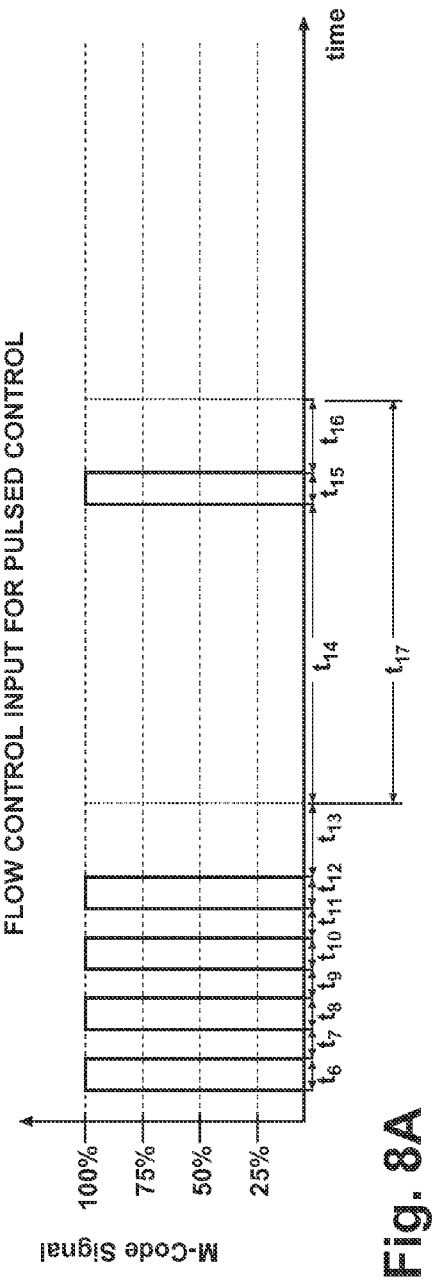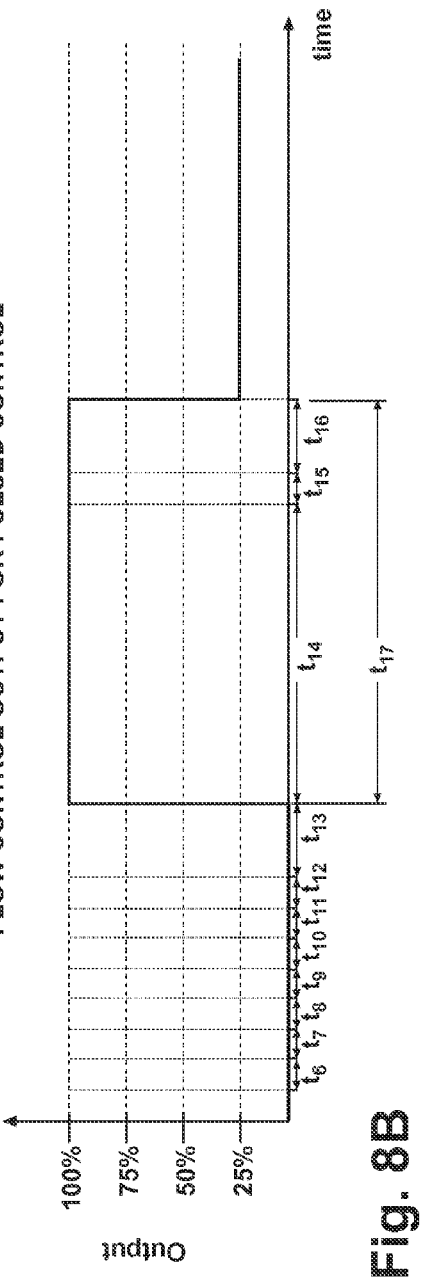

METHOD AND APPARATUS FOR DELIVERY OF MINIMUM QUANTITY LUBRICATION

CROSS REFERENCE TO RELATED APPLICATIONS

The present application claims the benefit of U.S. Provisional Patent Application No. 61/381,955, filed Sep. 11, 2010, which is incorporated herein by reference in its entirety.

BACKGROUND OF THE INVENTION

Computer Numerical Controlled (CNC) machines are commonly used for machining parts due to their advantages of speed, accuracy, and automation. These machines may perform a variety of functions on a workpiece such as drilling, lathing, milling machines, grinding, polishing, or may be dedicated to a single function. The machines use a variety of tools to perform these functions.

CNC machines use G-codes for controlling the various tools of the CNC machine. Miscellaneous function codes (M-codes) are a subset of the G-codes and used as auxiliary commands, such as for controlling the delivery of coolant to the various tools. There are a limited number of M-codes available, typically around eight or so, which limits the ability to communicate with the machine.

The delivery of lubricant or coolant is very important in machining of parts on the various tools of the CNC machine. High speed machining can create a very high level of friction between parts producing high levels of heat concentrated in small areas of the work surface. This high level of heat can result in warping of the workpiece or even friction welding, reduced machining speeds, and reduced lifetime of the tool. To prevent this, lubrication or coolant is supplied to the work surface of the workpiece to dissipate heat at local hot spots.

Lubricant or coolant may be flooded on to the work surface, but such methods typically use much more lubricant than is necessary and results in higher costs associated with higher volumes of lubricant usage and lubricant disposal and has negative environmental ramifications. More recently, there has been a trend towards using minimum quantity lubrication (MQL) systems for delivery of a smaller quantity of lubrication to a work surface.

SUMMARY OF THE INVENTION

One embodiment of the invention relates to a method of controlling the flow of lubricant in a minimum quantity lubricant system to a tool of a computer controlled machining system communicating via a predetermined number of numerical control communication codes. The machining system modulates one of the predetermined number of numerical control communication codes to form a lubricant flow level command, wherein the modulating the one of the predetermined number of numerical control communication codes comprises providing a pulsed signal for the one of the predetermined number of numerical control communication codes, the pulsed signal comprising one or more pulses, and the lubricant flow level command is based upon the number of the pulses. The lubricant system receives the lubricant flow level command and interprets the number of pulses in the lubricant flow level command to determine and set a corresponding lubricant flow level. The lubricant system then supplies lubricant to the tool at the lubricant flow level.

BRIEF DESCRIPTION OF THE DRAWINGS

In the drawings:

FIG. 8A is a graph of an M-code signal input for flow control operating a lubrication channel in a pulsed control mode.

FIG. 8B is a graph of the output flow of the channel corresponding to the input M-code signal of FIG. 8A.

DESCRIPTION OF AN EMBODIMENT OF THE INVENTION

The present invention relates generally to a minimum quantity lubrication system and the control of lubricant delivery using M-codes from a CNC machine. In one approach, the output of lubricant from the MQL system is controlled by modulating the M-codes from the CNC machine to control multiple lubrication channels using just one M-code per channel.

Figure 1:
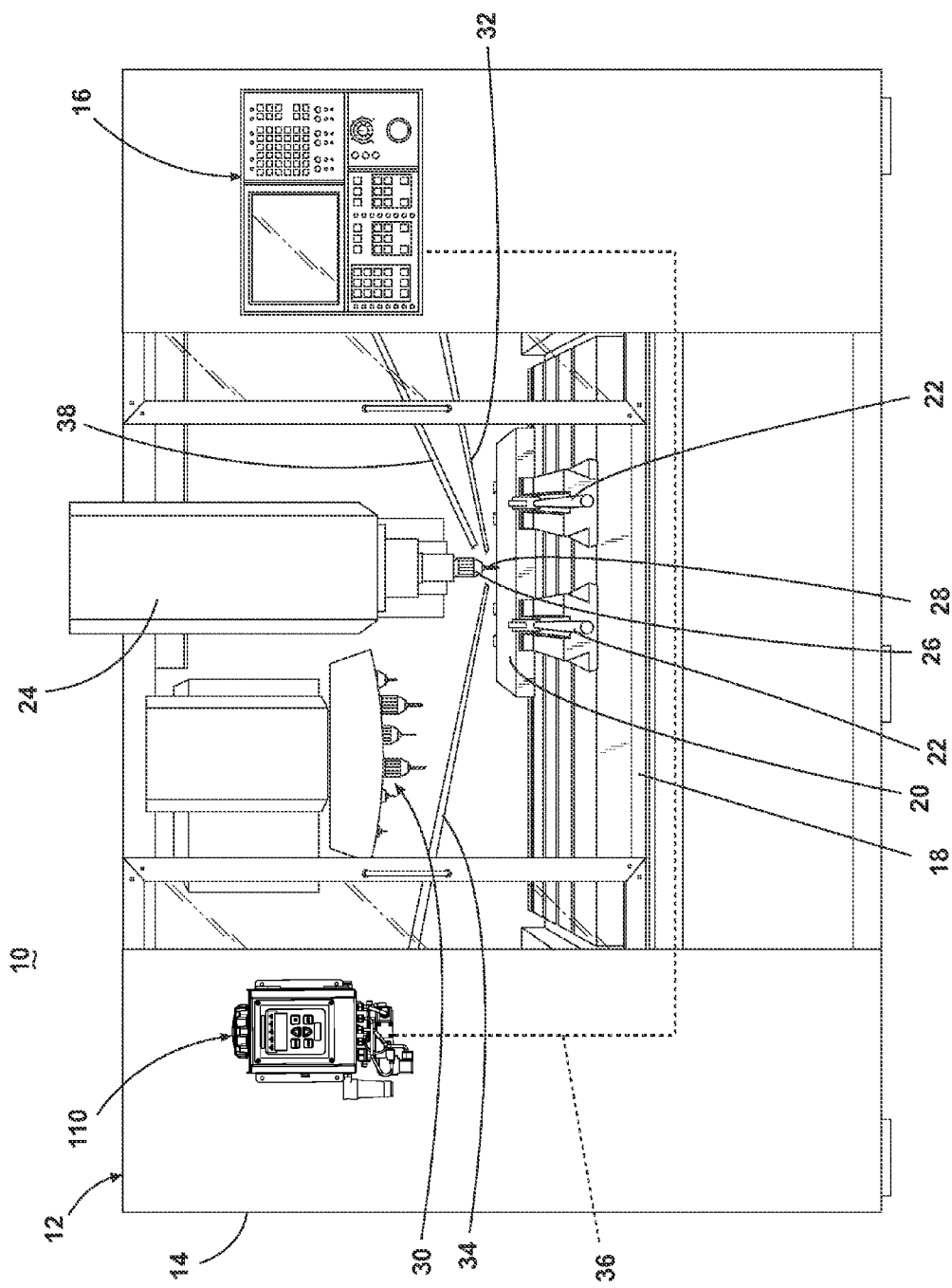
FIG. 1 is a schematic view of a vertical machine center (VMC) CNC machine with a MQL system mounted thereon.

FIG. 1 is a schematic view of a machining system 10 such as a CNC machine 12 with a MQL system 110 mounted thereon. This CNC machine 12 has a machine housing 14 surrounding substantially all of the machine, providing a shield from the work area of the CNC machine 12. A CNC control system 16 is provided for controlling the operations of the CNC machine 12. The CNC control system 16 is generally programmed by an operator of the CNC machine 12 by entering programming or instructions on the CNC control system 16 itself or by downloading programming to the CNC control system 16 by any variety of known means, such as by a communications network. A work platform 18 is provided within the machine housing 14 and supports a workpiece 20, which is to be machined. The workpiece 20 may further be clamped to the work platform 18 by one or more clamps 22. A tool 28 is held by a chuck 26 to a spindle (not shown) encased in a spindle housing 24 of the CNC machine 12. When the CNC 12 machine is operating, the tool 28 rotates and can be moved up and down to engage the workpiece 20 and machine it appropriately. There are also a variety of other tool heads 30 that can be attached to the chuck 26 to machine the workpiece 20. These tool heads 30 can be interchangeably attached to the chuck 26. The CNC control system controls the tools 28 and 30 and other components of the CNC machine 12 using G-codes.

The CNC machine 12 depicted is a vertical machining center (VMC) type that is commonly used in the machining arts. However, the invention applies to any other known types of CNC machines, including, but not limited to turret type machines.

The CNC machine 12 with MQL system 110 is shown with two lubricant delivery channels 32 and 34, but there could be any number of channels. Further, the MQL system may also provide one or more blow-off channels 38 that use a fluid, such as air, to blow-off chips formed during machining. These blow-off channels 38 may also be controlled using M-codes sent from the CNC control system 16 to the MQL system 110. The delivery of the lubricant can also be from a point internal to the tool and not external and off to the side. Lubricant delivery via channels within the tool is well known in the art and will not be expounded upon here.

As the CNC machine 12 operates on the workpiece, a high amount of heat may be generated due to friction between the tool 28 and the workpiece 20. As a result of the heat, it is necessary to provide a lubricant or coolant to the interface between the tool 28 and the workpiece 20. The lubricant is provided by one or more lubricant delivery conduits 32 and 34. The quantity of lubricant delivered via the lubricant delivery channel is metered by a MQL system 110 and controlled by the CNC control system 16. The amount of lubricant required is communicated from the CNC control system 16 to the MQL system 110 by sending a predetermined number of communication codes via one or more communication links 36. The CNC control system 16 modulates one of the predetermined number of communication codes to form a lubricant flow level command and transmits that command to the MQL system 110. The MQL system 110 in turn receives the lubricant flow level command and sets the lubricant flow level via lubricant delivery conduits 32 and 34. The communication codes used between the CNC machine 12 and the MQL system 110 may be a subset of G-codes, called miscellaneous codes or M-code, which are used to control auxiliary functions such as lubricant delivery.

There is an advantage to metering the quantity of lubricant to the interface between the tool 28 and the workpiece 20 to only what is needed, rather than providing an excess amount of lubricant, as is done in flood coolant delivery. This is because there is a financial, environmental, and performance benefit in not wasting lubricant. Excess lubricant can be detrimental to CNC machine 12 performance. Additionally, the lubricant often requires special disposal handling, and therefore, there is a financial benefit in reducing the amount of lubricant that must be disposed. Finally, there is an environmental benefit from not wasting excess lubricant and in not having excess lubricant treated after use. As a result, there is a benefit in providing only the amount of lubricant that is needed. The MQL system 110 of the present invention is suited for precise control of the amount of lubricant supplied to the workpiece 20. The amount of lubricant to be delivered by the MQL system 110 depends on the type of tool, the size of the tool, speed of the tool, the material being machined, and a number of other potential factors.

As mentioned above, the MQL system 110 is controlled, including setting lubricant flow rates, by the CNC control system 16 by use of M-codes. There are a limited number of M-codes that are available for use by a CNC control system 16. As a result, there is an advantage to controlling the multiple channels from the MQL system 110 with a minimal number of M-codes. The present invention provides a method of encoding flow information onto an M-code, such that turning on, turning off, and setting the flow level of the channel can be done with a single M-code per channel.

Figure 2:
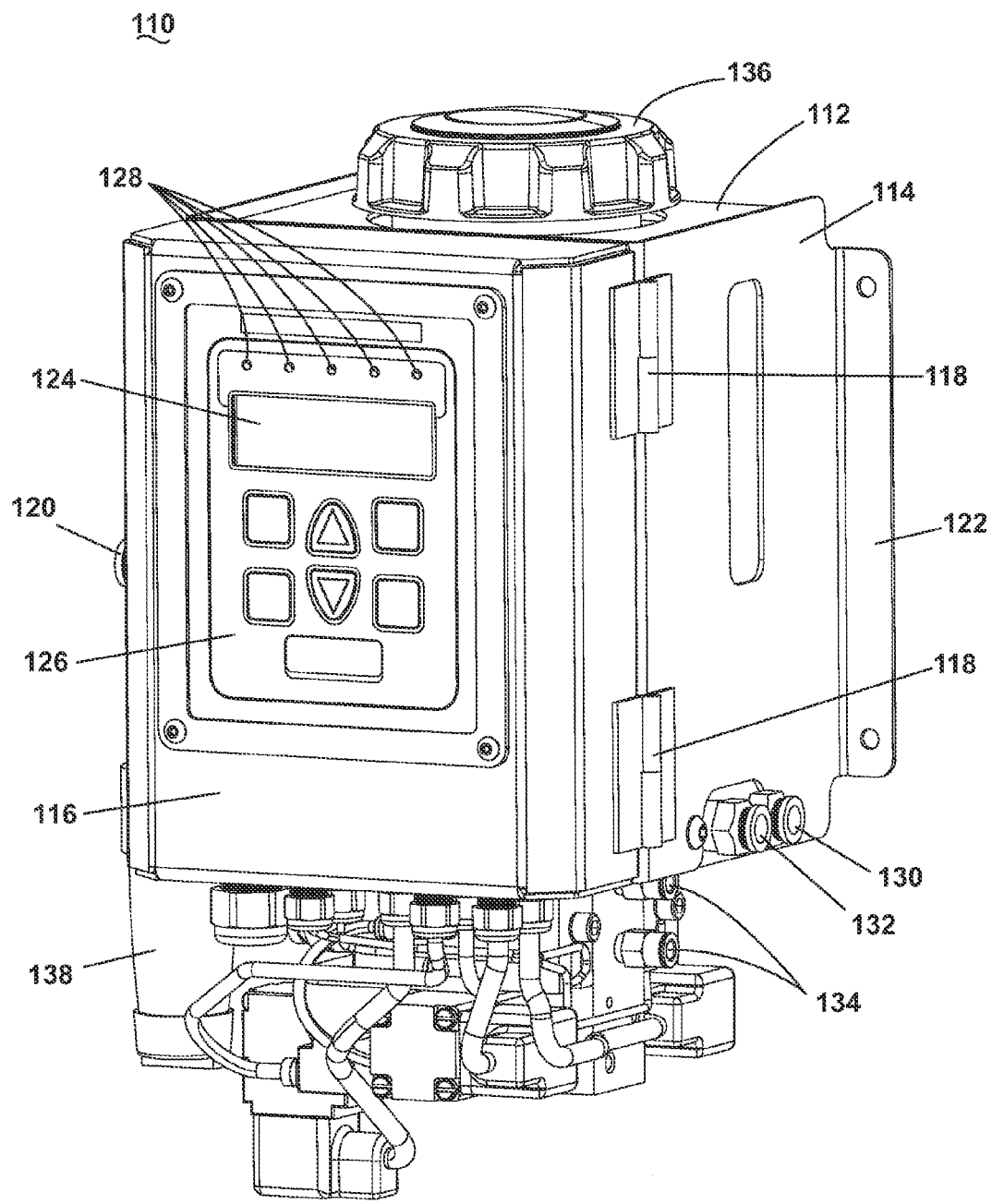
FIG. 2 is a front view of a MQL system according to one embodiment of the invention.

FIG. 2 is a front view of the MQL system 110 with a top housing 112, side housing 114, a front door 116, hingably mounted to the side housing 114 with hinges 118. There is a latching mechanism 120 on the opposite side of the door from the hinges 118 to allow the door 116 to open and close and be latched in the closed position. Mounting brackets 122 are also provided to mount the MQL system 110 onto the CNC machine 12 as shown in FIG. 1. A display 124 displays information to an operator of the MQL system 110, such as status, and alarms. An input interface 126 allows an operator to manually control the MQL system 110 by setting parameters on the MQL system 110. Light emitting diode (LED) indicator lights 128 display the status of M-code inputs, any confirmation codes that may be sent from the MQL system 110 to the CNC machine 12, such as an M-finish, and any alarms that may be tripped on the MQL system 110. There are two lubricant channel outlets 130 and 132 shown on the side of the MQL system 110. In addition, there are two blow-off outlets 134 to provide a flow of air to blow chips off of the workpiece. The outlets 130, 132, and 134 are configured such that tubing mates with them, such as polyurethane, poly-tetrafluoroethylene (PTFE), or nylon tubing, to carry the lubricant or blow-off air to the workpiece within the CNC machine 12. Such tubing may be part of the lubricant delivery conduits 32 and 34. The lubricant reservoir for the MQL system 110 can be accessed by unscrewing cap 136 at the top of the MQL system 110. There is also an air filter 138 that filters any particles that might be present in the air coming in through the air inlet 148 to the MQL system 110 from a compressed air source.

Figure 3:
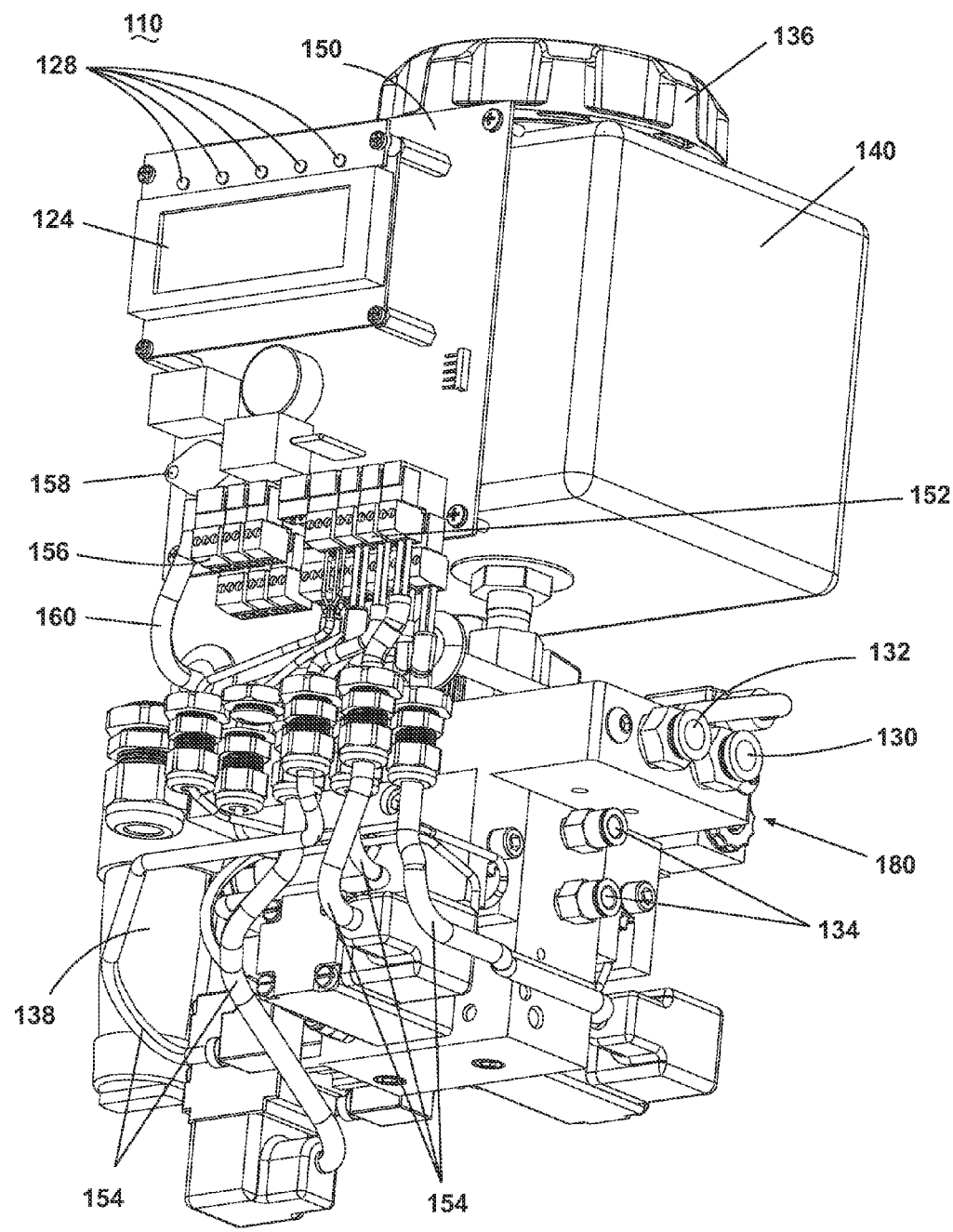
FIG. 3 is a front tilted view of the MQL system of FIG. 1 with the housing and door removed.
Figure 4:
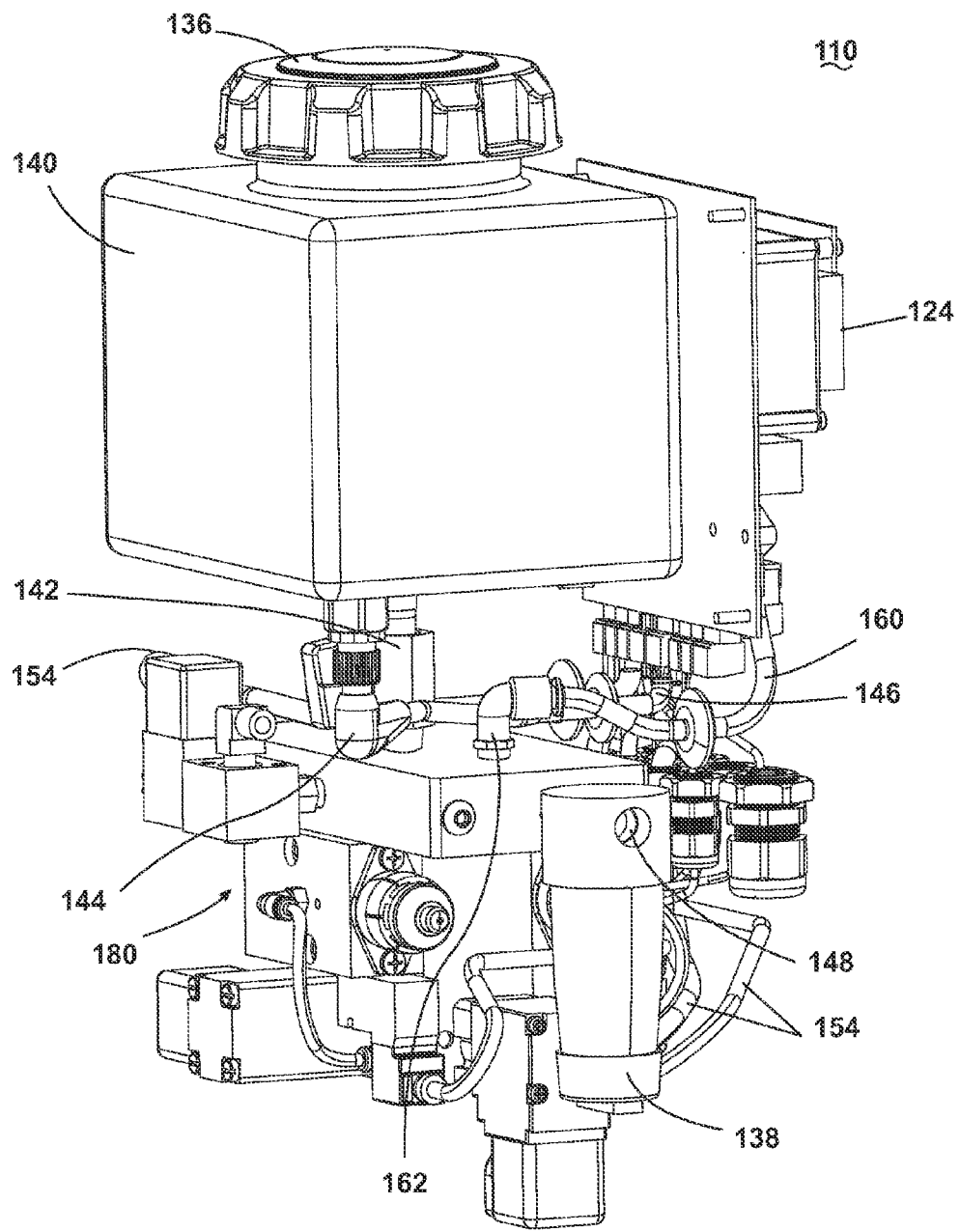
FIG. 4 is a rear tilted view of the MQL system of FIG. 1 with the housing and door removed.

FIGS. 3 and 4 are shown with the front door 116 and housing 112 and 114 removed to better show the internal components of the MQL system 110. The lubricant reservoir 140 provides lubricant to an injector manifold assembly 180 via lubricant conduit 142. The lubricant reservoir 140 also contains a level sensor (not shown) such as a float sensor that indicates the level of lubricant remaining in the lubricant reservoir 140. The level sensor signal is conducted via sensor cable 144 to sensor cable electrical connection 146. The sensor cable electrical connection 146 is one of many internal electrical connectors 152 that connect various components of the MQL system 110 to the control board 150 via electrical wires 154. The various electromechanical devices of the injector manifold assembly 180, for example, are controlled by the control board 150 via internal electrical connectors 152 and electrical wires 154. The control board can have various passive and active electrical devices mounted thereon, including resistors, capacitors, inductor, connectors, diodes, transistors, and integrated circuits. The integrated circuits may include a processor, microprocessor, field programmable gate array (FPGA), application specific integrated circuit (ASIC), digital signal processor (DSP), or any other known processing or logic unit. Such processing or logic units allow for interpretation of input signals, such as M-code signals and for controlling the various components of the MQL system 110. There also are external electrical connectors 156 disposed on the control board 150 for connecting to external devices such as the CNC control system 16. These external electrical connectors 156 may be used for receiving multiple M-code signals from the CNC control system 16 and for sending M-finish messages to the CNC control system 16. The control board 150 has a pressure sensor 158 connected thereon. The pressure sensor 158 is fluidly coupled to the compressed air input to the injector manifold assembly 180 via an air pressure sensor conduit interface 162 and an air pressure sensor conduit 160.

Figure 5:
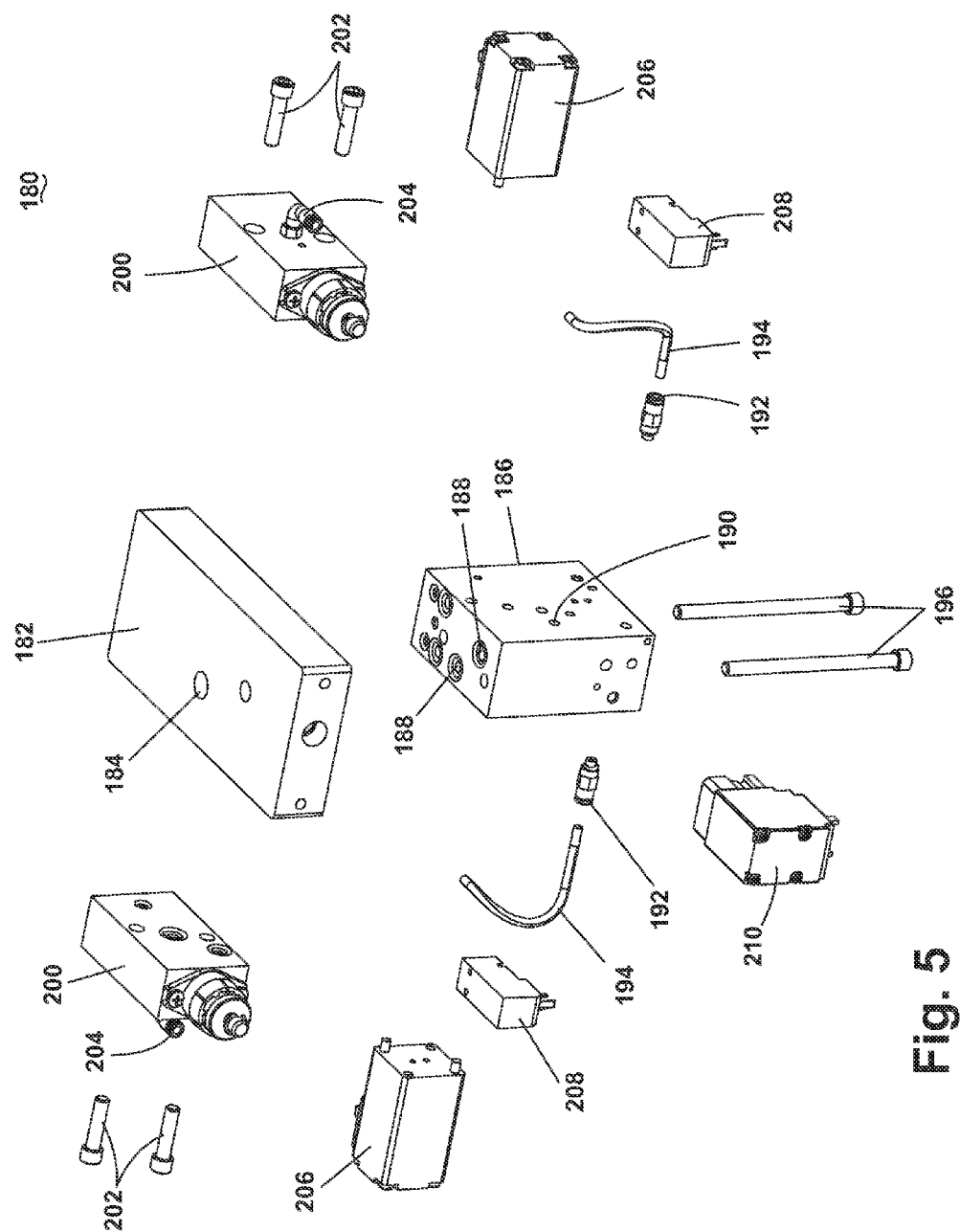
FIG. 5 is an exploded view of an injector manifold assembly of the MQL system of FIG. 2.
Figure 6:
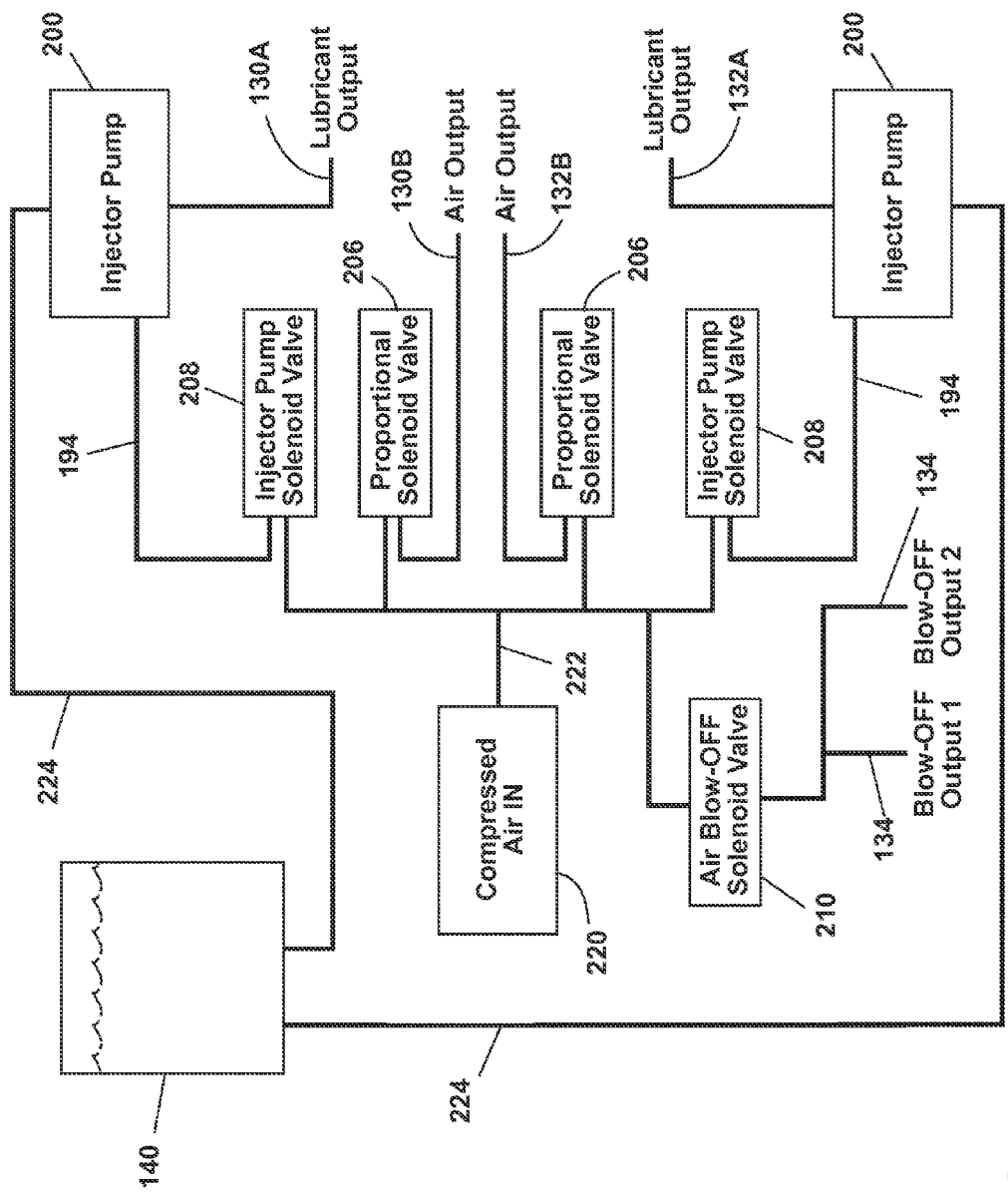
FIG. 6 is a schematic view of a plumbing diagram of the manifold assembly of FIG. 5.
Figure 7A:
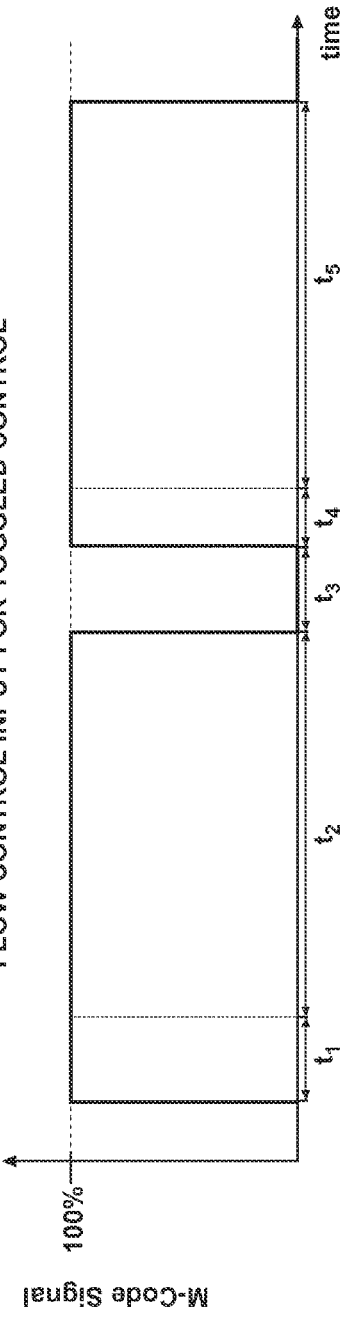
FIG. 7A is a graph of an M-code signal input for flow control operating a lubrication channel in a toggled control mode.
Figure 7B:
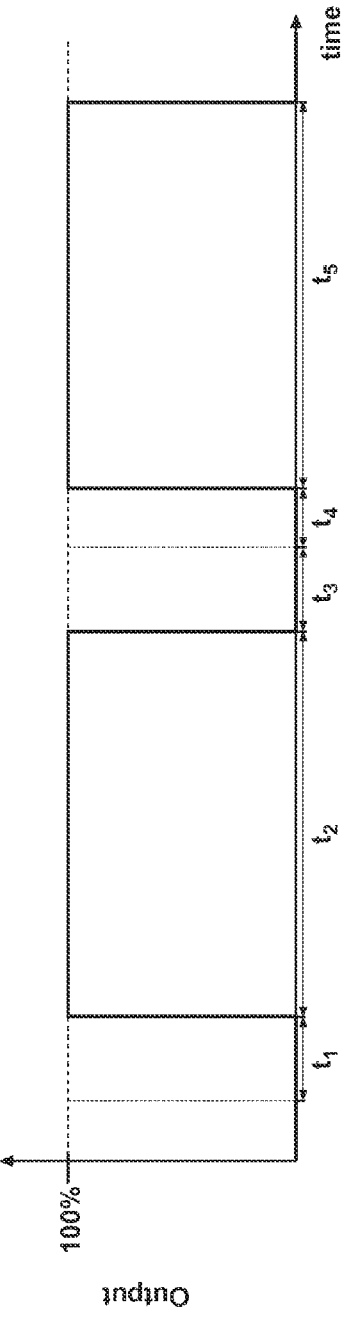
FIG. 7B is a graph of the output flow of the channel corresponding to the input M-code signal of FIG. 7A.

FIG. 5 shows an exploded view of the injector manifold assembly 180 and FIG. 6 shows a plumbing diagram of the injector manifold assembly 180. Both compressed air 220 and lubricant 140 is conducted through an inlet/outlet manifold 182. The lubricant enters the inlet/outlet manifold 182 via lubricant inlet 184 from lubricant conduit 142. The inlet/outlet manifold is positioned atop the injector mounting manifold 186 and is fastened together by vertical screws 196. The injector mounting manifold 186 receives both compressed air and lubricant via several inlets 188 and conducts the lubricant to two injector pumps 200 and the compressed air to two injector pump solenoid valves 208, two proportional solenoid valves 206, and one air blow-off solenoid valve 210. In FIG. 6, the lubricant pathways of the injector mounting manifold 186 and the inlet/outlet manifold block 182 are represented as lubricant line 224 and the air pathways are represented as compressed air line 222 for the purpose of simplicity. The two injector pump solenoid valves 208, two proportional solenoid valves 206, and one air blow-off solenoid valve 210 are actuated by control signals sent by the control board 150 via electrical wires 154. The actuation of electromechanical solenoid valves are well known in the art.

As the injector pump solenoid valves 208 are actuated, the injector pumps 200 are actuated via conduit between the injector mounting manifold 186 and the injector pump solenoid valves 208 and the injector pumps 200 to cause a controlled output of lubricant at 130A and 132A. Physically, an air outlet 190 is connected to an air inlet on the injector pumps 200 and routed to the injector pump solenoid valves 208 via a conduit in the injector pump 200 sending an air signal to the injector pumps 200 and causing the injector pumps to stroke. At the same time the proportional solenoid valves 206 are also actuated to cause a controlled output of air at 130B and 132B. In some cases, the proportional solenoid valves 206 may be actuated in proportion to the injector pump solenoid valves 208 to cause a controlled output of air at 130B and 132B. The air and lubricant output in close proximity to produce the lubricant output at 130 and 132. The close proximity of the two fluids causes the lubricant to aerosolize, atomize, mist, or otherwise form ultra-fine distinct volumes within the airstream. In some cases, the air outputs 130B and 132B may be tubes that surround lubricant outlet 130A and 132A tubes. Aerosolizing the lubricant leads to more even distribution of lubricant, especially for a low volume of lubricant, such as in this application.

The injector pumps 200 are capable of precisely providing a low volume of lubricant. The maximum output of the injector pumps 200 can be set anywhere from 0 to 255 drops per minute and preferably between 10 to 200 drops per minute, corresponding to 0 to 8.5 mL and preferably 0.33 to 6.67 mL per minute. The maximum output of the injector pumps 200 are set by the control board 150 of the MQL system 110. Additionally, the output from the injector pump 200 can be set at 25%, 50%, 75%, or 100% of maximum, based on M-code signal inputs to the control board 150, which the control board 150 then converts to electrical signals transmitted via electrical wires 154 to actuate the various solenoid valves 206 and 208.

In addition to the two lubricant channels, the control board 150 also controls the air blow-off solenoid valve 210 to output air to the blow-off outlets 134, according to M-code signal inputs from the CNC control system 16 to the control board 150. The air blow-off output may be controlled between 0 and 180 pulses per minute or 0 and 255 pulses per minute and the duty cycle may be set anywhere between 0% and 100%.

There are two ways to control the output of the lubricant channels. The first is a toggled control, where the output can either be set to on at 100% of maximum or turned off. The second is a pulsed control, where the output can be controlled as a fraction of the maximum output. While any fractional amount may be selected using the invention, it has been found that for most applications, fractional output of 25%, 50%, 75%, or 100% are sufficient.

FIG. 7A graphs an input M-code signal and 7B graphs the lubrication channel output as a percentage of the maximum and together demonstrate the functioning of the toggled output means of controlling the lubrication output. Once the M-code input signal goes high, the time from the low to high transition point is monitored. If that time exceeds a predetermined maximum pulse time ($t_1$), then the control board 150 recognizes the M-code signal as encoded as a toggled control to turn on the lubrication output at 100% of maximum as shown during the time span $t_2$. When the output is turned on under a toggled control, as soon as the M-code signal goes low from a high state, the output is turned off. The control board 150 continues to monitor the M-code signal from the CNC control system 16 and when the signal goes high again, and stays high for greater than the predetermined maximum pulse time ($t_4$) the output is again turned on at 100% of maximum. In a toggled control, the level of the output can not be set. The output can only be turned on or off. In other words, to turn on the output at 100% of maximum by toggled control, the M-code signal must transition from a low state to a high state and stay high for at least a predetermined maximum pulse time. The output then is turned off only if the input M-code signal transitions from a high to low state.

In contrast to the toggled control, the pulsed control provides a means to control the lubrication output flow as demonstrated in FIG. 8A, graphing the input M-code signal sent form the CNC control system 16 versus time and FIG. 8B, graphing the lubrication channel output as a percentage of the maximum output versus time. In essence, in pulsed control the control board 150 counts the number of pulses of duration shorter than the predetermined maximum pulse time, where the time between consecutive pulses is shorter than a predetermined maximum wait time. Based on the number of pulses counted before detecting a low input M-code signal exceeding the predetermined maximum wait time, the control board 150 sets the lubrication channel output. For example, if the control board detects one pulse it will set the output at 25% of maximum, two pulses indicates 50%, three pulses indicates 75%, four pulses indicates 100%, and five pulses indicates 0% or turning off the output. In FIG. 8A, the M-code signal transitions from low to high and stays high for a time span of $t_6$. The time span $t_6$ however is less than the predetermined maximum pulse time. Therefore, the high signal during time span $t_6$ is registered as a first pulse by the control board 150. Had the time span $t_6$ exceeded the predetermined maximum pulse time, then the control board would interpret it as a toggled turn on code. In this present case however, after time span $t_6$ the control board encounters another transition from low to high after a time span of $t_7$. $t_7$ is less than the predetermined maximum wait time and therefore, the pulse of width $t_8$, where $t_8$ is less than the predetermined maximum pulse time, is registered as the second pulse. The same is registered for the pulses of duration $t_{10}$ and $t_{12}$, for a total of 4 pulses. Next, a wait time of $t_{13}$, is observed by the control board, with $t_{13}$ equaling the predetermined maximum wait time. Thus after the time span of $t_{13}$, the control board interprets the M-code signal sent by the CNC control system 16 as four pulses, corresponding to a 100% of maximum output setting. As a result, the control board controls the various solenoid valves 206 and 208 to provide a 100% of maximum output as seen during time span $t_{17}$.

A time span $t_{14}$ after the lubrication output is at 100% of maximum, another pulse is registered for a time span of $t_{15}$. After this pulse, no other pulse is registered within the predetermined maximum wait time ($t_{16}$) and therefore, the control board 150 interprets the M-code input from the CNC control system as sending a single pulse corresponding to a 25% of maximum setting. At the end of time period $t_{16}$, the control board 150 sets the output at 25% of maximum. Note that the control board 150 maintains the output at the previous set point, such as during the time periods of $t_{15}$ and $t_{16}$, until it can make a determination of how many pulses were sent by the CNC control system 16.

There may be an advantage in having a low predetermined maximum pulse time and predetermined maximum wait time, so that the lubrication output can be changed more quickly. In one embodiment, the predetermined maximum pulse width may preferably be in the range of 25 ms to 500 ms, and more preferably 200 ms. In the same embodiment, the predetermined maximum wait time may preferably be in the range of 50 ms to 600 ms, and more preferably 300 ms.

In the example of FIGS. 8A and 8B, the output flow was partitioned into four levels (0, 25, 50, 75, and 100%); however, there can be any number of partitions, using similar pulse modulation encoding techniques. However, if there are a large number of partitions, counting of a larger number of pulses may result in a greater turn on latency which is undesirable from a reliability, consistency, and throughput standpoint.

Additionally, in the pulsed control example, a low pulse count represented a low set point, while a high pulse count represents a high set point. Alternatively, this may be reversed such that a single pulse may represent a 100% set point and four pulses represent a 25% set point. In such a case, applications that are more lubrication critical and require a higher set point will have lower turn on latency, reducing the possibility of tool or workpiece damage on those more critical steps.

It should also be noted that the air blow-off can also be controlled by similar means as discussed in conjunction with the lubricant channel outputs 130 and 132. Therefore, the blow-off output could also be set to a predetermined fraction of the maximum. Alternatively, the MQL system 110 and the air blow-off may be configured for 100% of maximum output. In that case, the output can either track the M-code signal in toggled mode or a single pulse can indicate a turn on condition when the output is off and a turn off condition when the output is on.

It can be seen that there are several advantages to the methods and apparatus disclosed herein, such as automatic control of the MQL system, directly from the CNC machine using control signals that CNC control systems generate. Additionally, the lubrication delivery programming on the CNC control system can be integrated, and therefore better coordinated with the programming for controlling the tools of the CNC machine. Additionally, by using a simple and easy to understand encoding technique, precious M-code signal are preserved for controlling a greater number of lubrication delivery channels or other auxiliary elements. Because the encoding techniques are easy to understand, minimal training will be required for machine operators who will program the CNC control systems for lubrication delivery using the MQL system 110 disclosed herein.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method of controlling the flow of lubricant in a minimum quantity lubricant system to a tool of a computer numerical controlled machining system communicating via a predetermined number of numerical control communication codes, the method comprising:

the machining system modulating one of the predetermined number of numerical control communication codes to form a lubricant flow level command, wherein the modulating the one of the predetermined number of numerical control communication codes comprises providing a pulsed signal for the one of the predetermined number of numerical control communication codes, the pulsed signal comprising one or more pulses, and the lubricant flow level command is based upon the number of the pulses;

the lubricant system receiving the lubricant flow level command and interpreting the number of pulses in the lubricant flow level command to determine and set a corresponding lubricant flow level; and the lubricant system supplying lubricant to the tool at the lubricant flow level.

2. The method of claim 1 wherein the numerical control communication codes comprise at least one miscellaneous function code (M-code).

3. The method of claim 1 wherein the one of the predetermined number of numerical control communication codes has a first level and a second level, the first level being higher than the second level, and the modulating one of the predetermined number of numerical control communication codes comprises setting the one of the predetermined number of numerical control communication codes at one of the first and the second level.

4. The method of claim 1 wherein the one of the predetermined number of numerical control communication codes has two levels, a first level and a second level, the first level being higher than the second level, and the modulating the one of the predetermined number of numerical control communication codes comprises changing the one of the predetermined number of numerical control communication codes from one of the second level to the first level and from the first level to the second level.

5. The method of claim 1 wherein each of the pulses are separated from each other by less than a first predetermined period of time.

6. The method of claim 1 wherein the corresponding lubricant flow is set after a second predetermined period of time after a last of the pulses.

7. The method of claim 1 wherein each of the pulses have a pulse width less than a third predetermined period of time.

8. The method of claim 1 wherein when the lubricant flow level is non-zero and a single pulse is detected, then the lubricant flow level is set to zero after a second predetermined period of time.

9. The method of claim 1 wherein each pulse corresponds to a predetermined percentage of a maximum lubricant flow level.

10. A minimum quantity lubrication system comprising:
at least one lubrication delivery channel;
at least one communication interface to accept a predetermined number of numerical control communication codes to control the at least one lubrication delivery channel, wherein at least one of the predetermined number of numerical control communication codes is pulsed to contain information of a lubricant flow level of the at least one lubrication delivery channel;
a controller that interprets the pulsing of the at least one of the predetermined number of numerical control communication codes to determine the lubricant flow level for the at least one lubricant delivery channel based on a number of pulses of the at least one of the predetermined number of numerical control communication codes; and
an injector pump controlled by the controller to provide the lubricant flow level.

11. The minimum quantity lubrication system of claim 10 wherein one of the numerical control communication codes is used to determine the lubricant flow level.

12. The minimum quantity lubrication system of claim 11 wherein the one of the communication codes comprises multiple pulses.

13. The minimum quantity lubrication system of claim 12 wherein each of the pulses are separated from each other by less than a first predetermined period of time.

14. The minimum quantity lubrication system of claim 13 wherein the lubricant flow level is interpreted after a second predetermined period of time after a last pulse of the multiple pulses.

15. The minimum quantity lubrication system of claim 14 wherein each of the pulses has a pulse width less than a third predetermined period of time.

16. The minimum quantity lubrication system of claim 12 wherein when the lubricant flow level is non-zero and a single pulse is detected, then the lubricant flow level is set to zero after a second predetermined period of time.

17. The minimum quantity lubrication system of claim 12 wherein each pulse corresponds to a predetermined percentage of a maximum lubricant flow level.

* * * * *